US012706643B2

(12) United States Patent
Sun et al.

(10) Patent No.: US 12,706,643 B2
(45) Date of Patent: Aug. 11, 2026

(54) USER EQUIPMENT FOR CHANNEL STATE INFORMATION (CSI) REPORTING FOR TRP OPERATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Huaning Niu, San Jose, CA (US); Ismael Gutierrez Gonzalez, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 18/247,205

(22) PCT Filed: Oct. 2, 2020

(86) PCT No.: PCT/CN2020/119797
§ 371 (c)(1),
(2) Date: Mar. 29, 2023

(87) PCT Pub. No.: WO2022/067863
PCT Pub. Date: Apr. 7, 2022

(65) Prior Publication Data

US 2023/0379031 A1 Nov. 23, 2023

(51) Int. Cl.
*H04L 1/06* (2006.01)
*H04B 7/06* (2006.01)
*H04W 88/02* (2009.01)

(52) U.S. Cl.
CPC ......... *H04B 7/0626* (2013.01); *H04B 7/0632* (2013.01); *H04L 1/0693* (2013.01); *H04W 88/023* (2013.01)

(58) Field of Classification Search
CPC ... H04B 7/0626; H04B 7/0632; H04L 5/0035; H04L 5/0051; H04L 5/0057;
(Continued)

(56) References Cited

U.S. PATENT DOCUMENTS 9,155,098 B2 * 10/2015 Geirhofer ............. H04W 72/51
2016/0205676 A1 * 7/2016 Chen ....................... H04L 5/005 370/329

(Continued)

FOREIGN PATENT DOCUMENTS

CN 107689843 2/2018
CN 108282212 7/2018

(Continued)

OTHER PUBLICATIONS

AT&T, "CSI measurement for dynamic BWP switching", 3GPP TSG RAN WG1 Meeting ah 1801, R1-1800580, Jan. 26, 2018, 3 sheets.

(Continued)

*Primary Examiner* — Salvador E Rivas
(74) *Attorney, Agent, or Firm* — Fay Kaplun & Marcin, LLP

(57) ABSTRACT

A user equipment (UE) reports channel state information (CSI) to a network. The UE receives, from a base station, at least one channel state information (CSI) report configuration, wherein each CSI report configuration includes at least one reference resource set configuration, wherein each reference resource set configuration includes at least one reference resource configuration and sends, to the base station, a transmission indicating whether the UE prefers a single
(Continued)

transmission and reception point (TRP) mode or a multiple TRP (multi-TRP) mode.

20 Claims, 4 Drawing Sheets

(58) Field of Classification Search
CPC .... H04L 5/0094; H04L 1/0693; H04W 24/10; H04W 88/06; H04W 88/023
See application file for complete search history.

(56) References Cited

U.S. PATENT DOCUMENTS

| | | | | |
|---|---|---|---|---|
| 2019/0260448 | A1* | 8/2019 | Rahman | H04L 5/0048 |
| 2020/0350967 | A1* | 11/2020 | Xu | H04L 5/0051 |
| 2021/0152307 | A1* | 5/2021 | Takeda | H04L 25/0224 |
| 2021/0250217 | A1* | 8/2021 | Shattil | H04B 7/0632 |
| 2021/0258060 | A1* | 8/2021 | Gao | H04L 5/0057 |
| 2021/0391967 | A1* | 12/2021 | Gao | H04L 5/005 |
| 2022/0039099 | A1* | 2/2022 | Faxér | H04L 5/0051 |
| 2022/0094399 | A1* | 3/2022 | Gao | H04B 7/0626 |
| 2022/0337300 | A1* | 10/2022 | Yuk | H04L 1/0028 |
| 2023/0093589 | A1* | 3/2023 | Wu | H04B 7/0486 375/267 |
| 2023/0120578 | A1* | 4/2023 | Khoshnevisan | H04L 1/0027 370/329 |

FOREIGN PATENT DOCUMENTS

| | | |
|---|---|---|
| CN | 111416644 | 7/2020 |
| EP | 3 355 484 | 8/2018 |
| WO | 2018/230967 | 12/2018 |
| WO | 2019/183878 | 10/2019 |
| WO | 2020/028488 | 2/2020 |
| WO | 2020/052428 | 3/2020 |
| WO | 2020/089863 | 5/2020 |
| WO | 2020/167564 | 8/2020 |

OTHER PUBLICATIONS

Ericsson: “CSI feedback for multi-TRP”, 3GPP TSG-RAN WG1 #91, R1-1720974, Nov. 18, 2017, 9 sheets,.

Huawei et al.: “Remaining issues for CSI framework”, 3GPP TSG RAN WG1 Ad Hoc Meeting, R1-1800529, Jan. 13, 2018, 6 sheets.

* cited by examiner

USER EQUIPMENT FOR CHANNEL STATE INFORMATION (CSI) REPORTING FOR TRP OPERATION

TECHNICAL FIELD

This application relates generally to wireless communication systems, and in particular relates to channel state information reporting for TRP operation.

BACKGROUND

In 5G new radio (NR) wireless communications, the 5G NR network may utilize transmission and reception points (TRP) to improve reliability of the wireless channels. 3GPP Release 16 discusses 6 different TRP schemes: multi downlink control information (DCI) based multi-TRP mode, single-DCI based multi-TRP special domain multiplexing (SDM)scheme, single-DCI based multi-TRP frequency domain multiplexing (FDM) Scheme A, single-DCI based multi-TRP FDM Scheme B, single-DCI based multi-TRP time domain multiplexing (TDM) scheme, and single-DCI based multi-TRP scheme 4 scheme.

SUMMARY

Some exemplary embodiments are related to a user equipment (UE) having a transceiver configured to connect to a base station and a processor communicatively coupled to the transceiver and configured to perform operations. The operations include receiving, from the base station, at least one channel state information (CSI) report configuration, wherein each CSI report configuration includes at least one reference resource set configuration, wherein each reference resource set configuration includes at least one reference resource configuration and sending, to the base station, a transmission indicating whether the UE prefers a single transmission and reception point (TRP) mode or a multiple TRP (multi-TRP) mode.

Other exemplary embodiments are related to one or more processors configured to perform operations. The operations include receiving, from a base station, at least one channel state information (CSI) report configuration, wherein each CSI report configuration includes at least one reference resource set configuration, wherein each reference resource set configuration includes at least one reference resource configuration and sending, to the base station, a transmission indicating whether the UE prefers a single transmission and reception point (TRP) mode or a multiple TRP (multi-TRP) mode.

DETAILED DESCRIPTION

Figure 1:
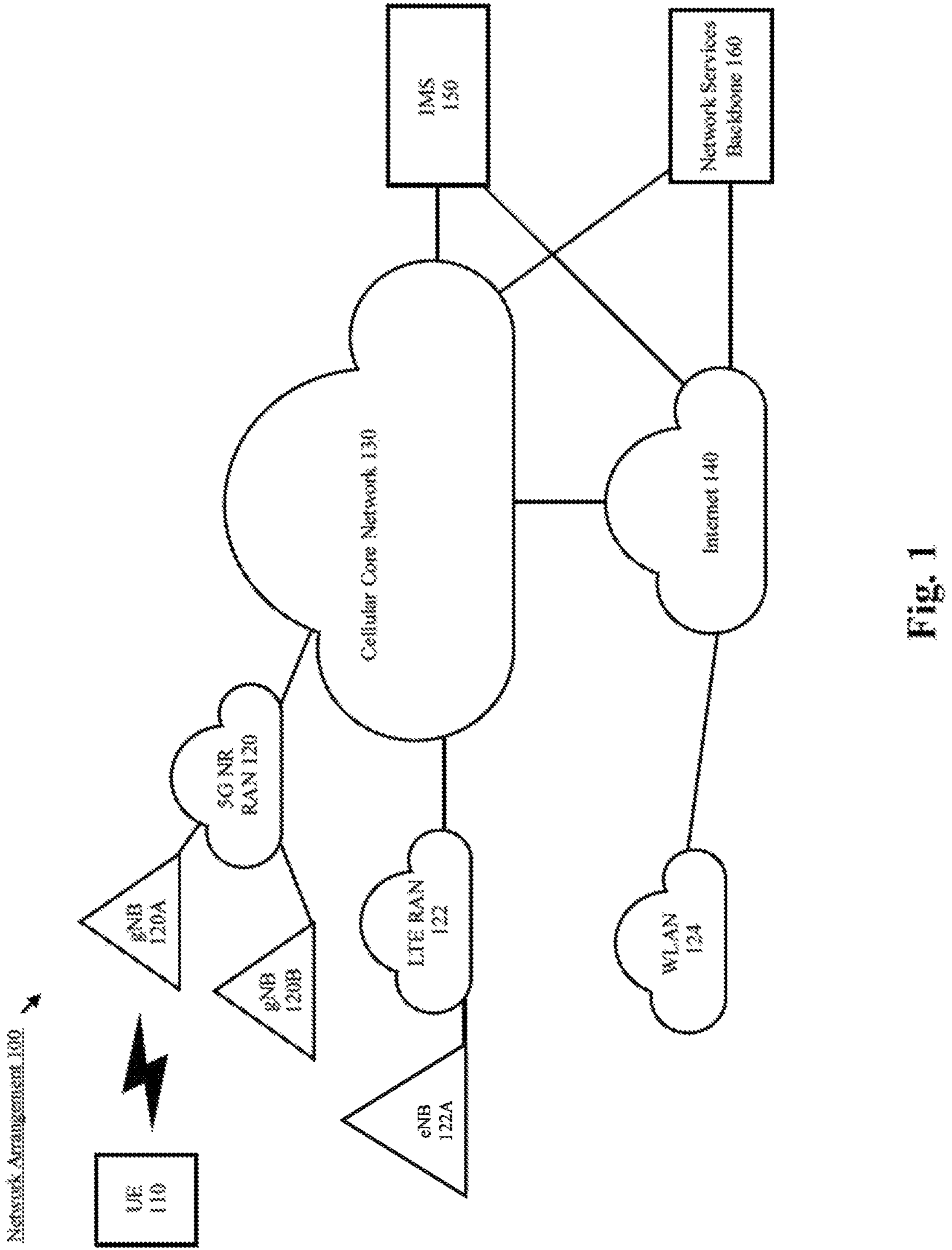
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a user equipment (UE) to apprise a 5G new radio (NR) network base station of the UE's preferred TRP scheme via a channel state information (CSI) report.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, 3GPP Release 16 discusses six modes of multi-TRP mode: multi-DCI based Multi-TRP mode and five single-DCI based Multi-TRP mode schemes. The five single-DCI based Multi-TRP mode schemes are an SDM (single transport block (TB)), FDMSchemeA (single TB), FDMSchemeB (dual TB), TDMSchemeA (intra-slot repetition), and Scheme 4 (inter-slot repetition). However, Release 16 does not provide a means for the UE to inform the gNB of the UE's preferred TRP mode (single-TRP, multi-TRP, and which mode if multi-TRP). As a result, the gNB may configure the UE with a TRP scheme that is not optimal.

According to some exemplary embodiments, as part of the CSI processing procedure, the UE informs the gNB of the UE's TRP mode preference and, in the case of multi-TRP mode, which TRP the UE prefers.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
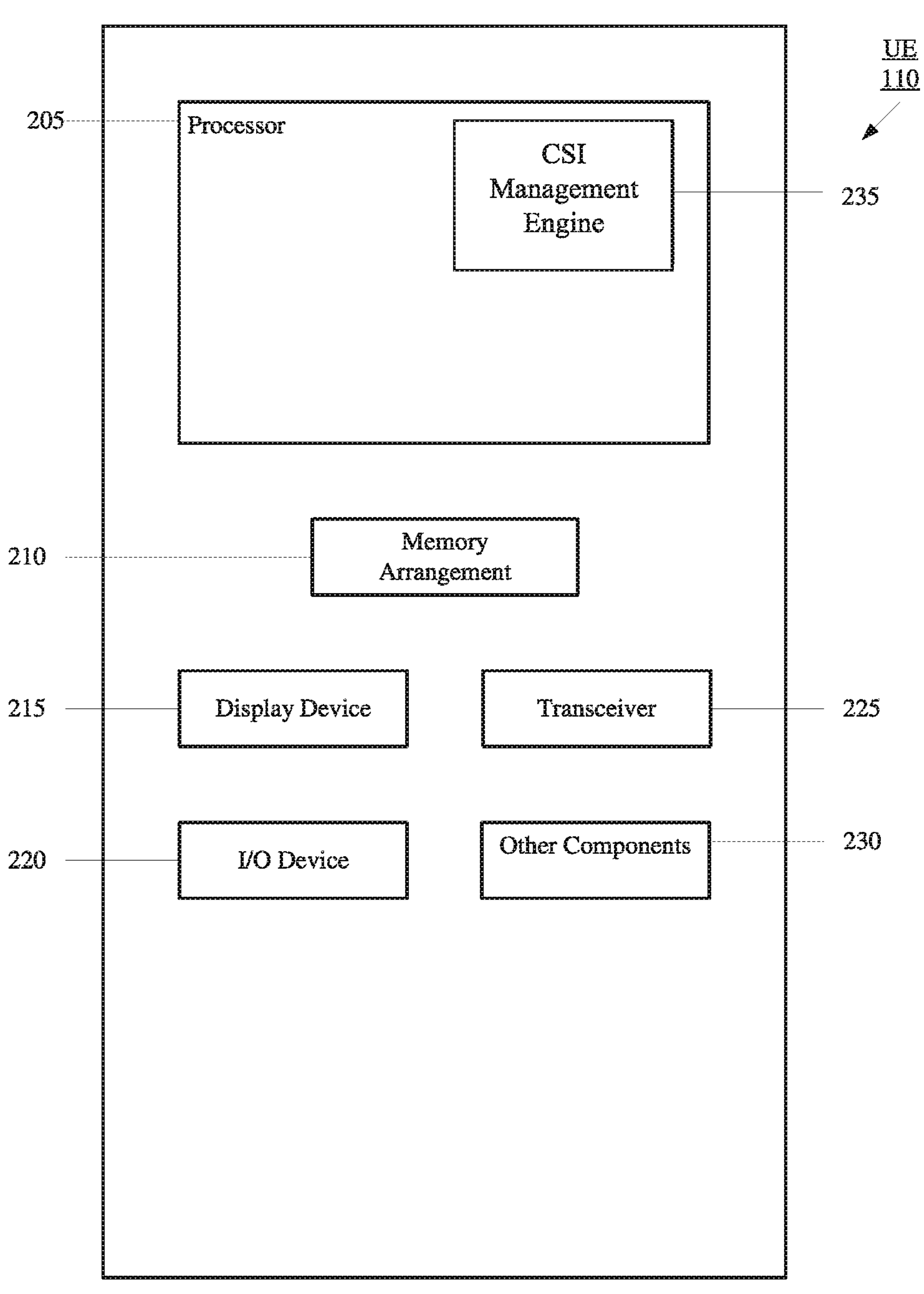
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a CSI management engine 235. The CSI management engine 235 may perform various operations related to performing CSI measurements on a channel, determining a preferred TRP scheme, and providing a CSI report back to the network (e.g., via the gNB).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
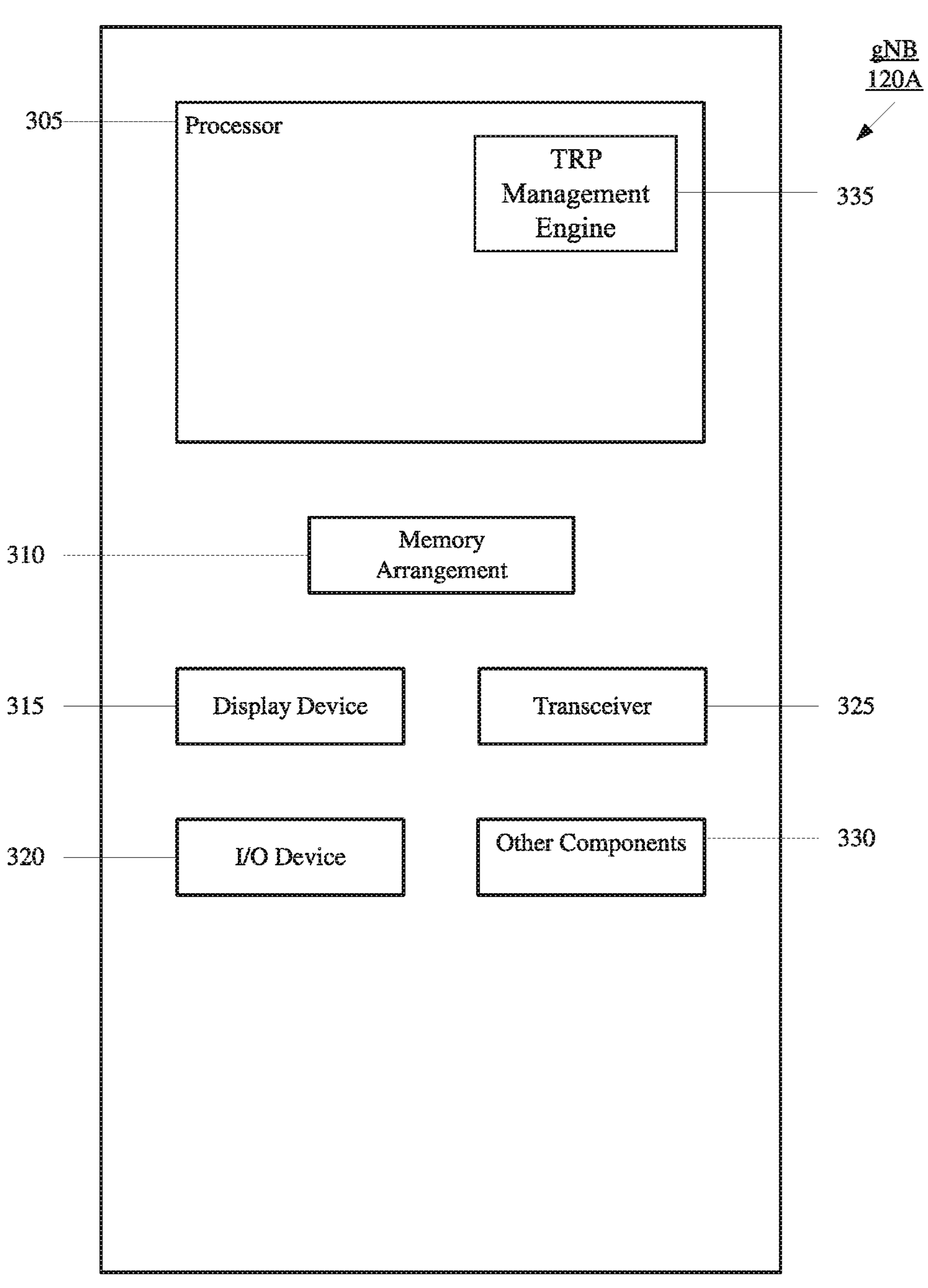
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a TRP management engine 335 for performing operations including determining a TRP scheme for the UE 110 based on received TRP feedback from the UE. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
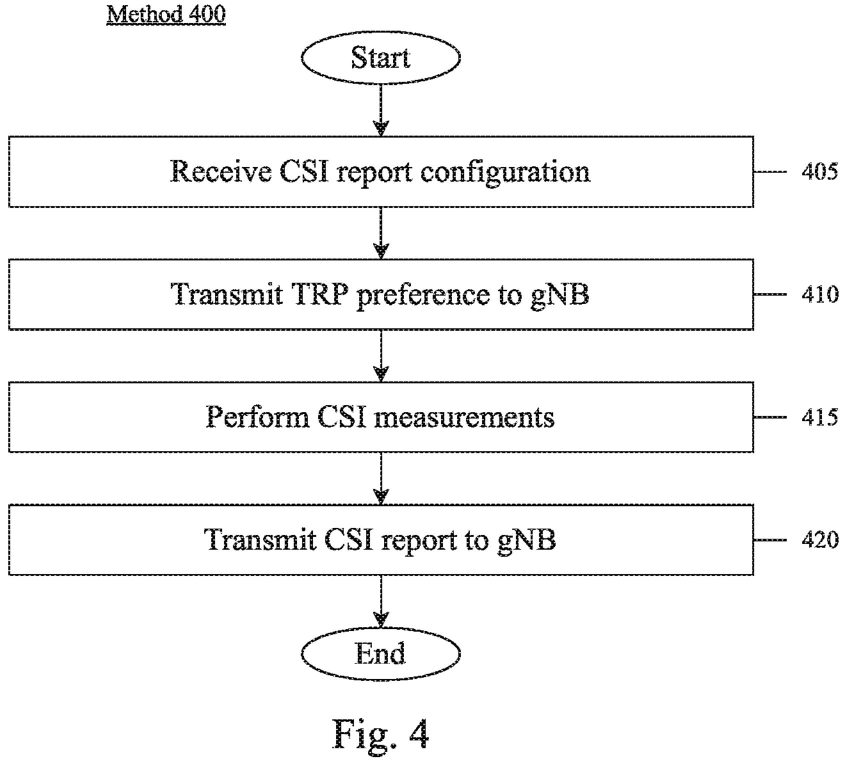
FIG. 4 shows a method of apprising a gNB of a UE's TRP preference according to various exemplary embodiments.

FIG. 4 shows a method 400 of apprising a gNB of a UE's TRP preference according to various exemplary embodiments. At 405, the UE 110 receives a CSI report configuration from the gNB 120*a* (or 120*b*). At 410, the UE 110 transmits its TRP preference to the gNB 120*a*, as will be described in more detail below with respect to FIG. 5. At 415, the UE 110 performs the CSI measurements. At 420, the UE 110 transmits the CSI report with the CSI measurements to the gNB 120*a*. The method 400 may be repeated to allow the UE 110 to report a change in TRP preference to the gNB 120*a*.

Figure 5:
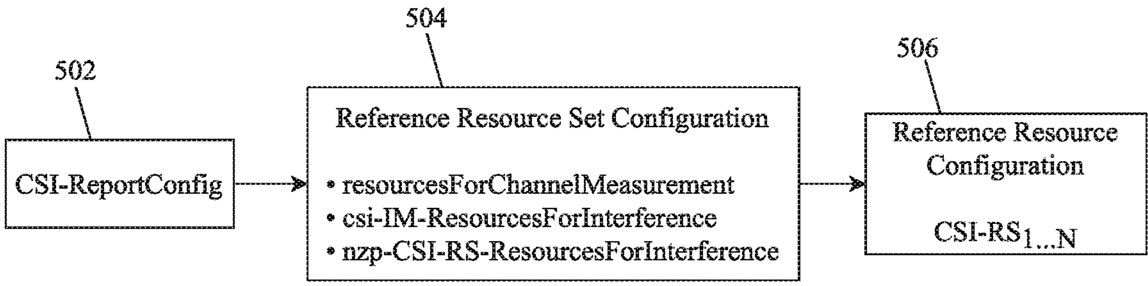
FIG. 5 shows an exemplary diagram illustrating a CSI report hierarchy according to various exemplary embodiments.

FIG. 5 shows an exemplary diagram illustrating a CSI report hierarchy according to various exemplary embodiments. A CSI report configuration 502 is configured by the gNB 120*a* and send to the UE 110. In some embodiments, multiple CSI report configurations 502 may be transmitted to the UE 110. Some CSI reports may correspond to single-TRP mode and other CSI reports may correspond to multi-TRP mode. The indication of which TRP mode a report corresponds to may either be implicitly or explicitly indicated in the report configuration. In some embodiments, to apprise the gNB 120*a* of the UE's TRP preference, the UE 110 only performs the CSI measurements of the CSI reports corresponding to the desired TRP mode (e.g., multi-TRP mode). The remaining CSI reports corresponding to the other TRP mode (e.g., single-TRP mode) are skipped. In some embodiments, the UE 110 may alternatively report a reserved or invalid value for the CSI reports corresponding to the non-preferred TRP mode (instead of skipping those reports entirely).

Each CSI report configuration 502 includes a reference resource set configuration 504. As illustrated in FIG. 5, these resource sets may include channel measurement resources (CMR) (resourcesForChannelMeasurement), zero-power interference measurement resources (IMR) (csi-IM-ResourcesForInterference), and non-zero-power IMRs (nzp-RS-ResourcesForInterference). In some embodiments, some resource sets correspond to the single-TRP mode and some sets correspond to the multi-TRP mode. The indication of which TRP mode a resource set corresponds to may either be implicitly or explicitly indicated in the report configuration. In some embodiments, to apprise the gNB 120*a* of the UE's TRP preference, the UE 110 reports the reference resource set index of the preferred resource set. The reference resource set index identifies a particular resource set. In such an embodiment, the preferred resource set corresponds to a preferred TRP mode. In some embodiments, if the preferred TRP mode is the multi-TRP mode, the preferred reference resource set may also correspond to a preferred TRP.

Each CSI reference resource set configuration 504 includes multiple (N) reference resource configurations 506 ($CSI_{1 \ldots N}$). In some embodiments, some resources correspond to the single-TRP mode and other resources correspond to the multi-TRP mode. The indication of which TRP mode a resource corresponds to may either be implicitly or explicitly indicated in the report configuration. In some embodiments, to apprise the gNB 120*a* of the UE's TRP preference, the UE 110 reports the CSI-RS resource indicator (CRI) of the preferred resource set. The CRI identifies a particular resource from the configured resources. In such an embodiment, the preferred resource corresponds to a preferred TRP mode. In some embodiments, if the preferred TRP mode is the multi-TRP mode, the preferred reference resource may also correspond to a preferred TRP. For each CSI reference, there are potentially multiple ports (e.g., 32 ports) received at the UE 110. In some embodiments, the TRP-mode preference may alternatively be reported by the UE 110 to the gNB 120*a* at the port level.

In some cases, the CSI report configuration and CSI reference resource configuration may exceed the UE capability, which includes the maximum number of CSI processing units (CPUs) and the maximum number of active CSI-RS resources that the UE can handle simultaneously. This may be due to the fact that the gNB 120*a* requires the UE 110 to perform all CSI measurements regardless of whether the measurements correspond to single-TRP mode or multi-TRP mode. In some embodiments, for multi-TRP CSI reporting, when the CSI report configuration and CSI reference resource configuration exceed the UE capability, the UE 110 drops/omits CSI reports that the UE 110 cannot process. In some embodiments, a priority rule may be defined for the dropping. For example, in some embodiments the single TRP CSI reports may be prioritized over multi-TRP CSI reports. In some embodiments the multi-TRP CSI reports may alternatively be prioritized over single TRP CSI reports. In some embodiments, when determining how many CPUs each CSI report will require, the UE 110 may double count the number of CPUs that a multi-TRP CSI report will require due to the added complexity of multi-TRP CSI measurements compared to single TRP CSI measurements.

A control resource set index (CORESETPoolIndex) is used to differentiate control from different TRPs. In some embodiments, the CORESETPoolIndex (or other logic index) may be used to configure the TRP index for the CSI report configuration 502 (CSI-ReportConfig), the CSI reference resource set 504 (nzp-CSI-RS-ResourceSet) in each CSI report, and/or the CSI reference resource 506 (nzp-CSI-RS-Resource) in each resource set. In such a scenario, one (or more) CSI report may be configured for one TRP and one (or more) CSI report may be configured for another TRP. Similarly, one (or more) CSI reference resource set may be configured for one TRP and one (or more) CSI reference resource set may be configured for another TRP. Similarly, one (or more) CSI reference resource may be configured for one TRP and one (or more) CSI reference resource may be configured for another TRP.

In such an embodiment, instead of explicitly indicating to the gNB 120*a* which TRP the UE 110 prefers, the UE 110 may alternatively report the index (report index, resource set index, or resource index) corresponding to the preferred TRP. The UE 110's reporting of a preferred TRP is considered dynamic point selection (DPS) and allows the UE 110 to switch between TRP modes and between TRPs. After reporting the index corresponding to the preferred TRP, the UE 110 may report the Rank Indicator (RI), channel quality indicator (CQI) and precoding matrix indicator (PMI) for each TRP so that the gNB 120*a* has additional flexibility in selecting a TRP mode and/or a TRP.

One of the parameters that the UE 110 reports to the gNB 120*a* in the CSI report is a rank indicator (RI). For multi-TRP mode, the UE 110 may include a RI for each TRP in the CSI report. In some embodiments, the UE 110 may alternatively perform joint encoding, as shown in Table 1 below, to reduce the payload size for the RI of the CSI report.

TABLE 1

| RI for TRP1 | RI for TRP2 | Joint RI |
|---|---|---|
| 0 | 1 | 0 |
| 1 | 0 | 1 |
| 1 | 1 | 2 |
| 1 | 2 | 3 |
| 2 | 1 | 4 |
| 2 | 2 | 5 |

An RI value of 0 indicates that the corresponding TRP is not preferred. Assuming the total number of layers per TRP that can be handled by the UE is four (4), in some embodiments, the difference between the RI for each TRP may be limited to 1 to reduce the total number of possible combinations of joint RI values. As a result, for two TRPs, the number of possible combinations is five, as shown in Table 1.

If no RI restriction is introduced, the total number of possible combinations is fourteen, as shown in Table 2 below.

TABLE 2

| RI for TRP1 | RI for TRP2 | Joint RI |
|---|---|---|
| 0 | 1 | 0 |
| 0 | 2 | 1 |
| 0 | 3 | 2 |
| 0 | 4 | 3 |
| 1 | 0 | 4 |
| 1 | 1 | 5 |
| 1 | 2 | 6 |
| 1 | 3 | 7 |
| 2 | 0 | 8 |
| 2 | 1 | 9 |
| 2 | 2 | 10 |
| 3 | 0 | 11 |
| 3 | 1 | 12 |
| 4 | 0 | 13 |

RI restrictions may also be introduced based on the TRP mode. For example, in some embodiments, for single DCI based multi-TRP SDM mode, the RI restriction may be that the maximum RI for each TRP is two (2). This limits the total number of joint RI possibilities to eight. In some embodiments, for other schemes of the single DCI based multi-TRP mode, the RI restriction may be that the RI for each TRP must be equivalent to the RI for the other TRP. This limits the total number of joint RI possibilities to two (1,1 and 2,2). It should be noted, however, that other RI restrictions may be utilized depending on the TRP mode and scheme. For example, each TRP may be configured with an independent RI restriction. Alternatively, the RI restriction may be jointly configured for the multiple TRPs.

Another parameter that the UE 110 reports to the gNB 120*a* in the CSI report is the PMI. In some embodiments, for multi-TRP CSI reports, the UE 110 may report multiple PMI values, each of which corresponds to a TRP. Yet another parameter that the UE 110 reports to the gNB 120*a* in the CSI report is the CQI. In some embodiments, for multi-DCI based multi-TRP reporting, multiple CQI values may be reported, each of which corresponds to a TRP. In such an embodiment, the CQI values may be jointly encoded using differential encoding to reduce the reporting overhead. In some embodiments, for single-DCI based multi-TRP reporting, a single CQI value may be reported since a single transport block (TB) is being transmitted.

In some embodiments, in addition to reporting which TRP mode the UE 110 prefers, the UE 110 additionally indicates which scheme (SDMScheme, FDMSchemeA, FDMSchemeB, TDMSchemeA, Scheme4) of single-DCI based multi-TRP it prefers if the UE 110 prefers single-DCI based multi-TRP. Subsequently, the UE 110 may report the preferred PMI, CQI, RI, and CRI to the gNB 120*a*. Such a report may be a newly defined enhanced CSI report having a mode indicator quantity defined therein and transmitted via a physical uplink control channel (PUCCH) or a physical uplink shared channel (PUSCH). Alternatively, another type of report may be defined for reporting the preferred scheme. Since mode selection is semi-persistent, such a report may be transmitted to the UE 110 via a medium access control control element (MAC-CE) transmission or radio resource control (RRC) transmission.

EXAMPLES

In a first example, one or more processors are configured to perform operations comprising receiving, from a base station, at least one channel state information (CSI) report configuration, wherein each CSI report configuration includes at least one reference resource set configuration, wherein each reference resource set configuration includes at least one reference resource configuration and sending, to the base station, a transmission indicating whether the UE prefers a single transmission and reception point (TRP) mode or a multiple TRP (multi-TRP) mode.

In a second example, the one or more processors of the first example, wherein one or more of (a) the at least one CSI report configuration, (b) at least one reference resource set configuration, and (c) at least one reference resource configuration correspond to one of the single TRP mode or the multi-TRP mode.

In a third example, the one or more processors of the second example, wherein the operations further comprise performing CSI measurements based on the at least one reference resource configuration, wherein the at least one CSI report configuration includes one or more CSI report configurations corresponding to the single TRP mode and one or more CSI configurations corresponding to the multi-TRP mode, wherein the CSI measurements correspond to the at least one CSI report configuration that corresponds to a preferred TRP mode, and wherein the transmission includes a CSI report including the CSI measurements.

In a fourth example, the one or more processors of the second example, wherein the at least one reference resource set configuration includes one or more reference resource sets corresponding to the single TRP mode and one or more reference resource sets corresponding to the multi-TRP mode, and wherein the transmission includes a reference resource set index identifying one of the at least one reference resource set corresponding to a preferred TRP mode.

In a fifth example, the one or more processors of the second example, wherein the at least one reference resource configuration includes one or more reference resources corresponding to the single TRP mode and one or more reference resources corresponding to the multi-TRP mode, and wherein the transmission includes a reference CSI resource indicator (CRI) identifying one of the at least one reference resource corresponding to a preferred TRP mode.

In a sixth example, the one or more processors of the first example, wherein when the at least one CSI report configuration includes a plurality of CSI report configurations that exceed a UE capability, the operations further comprise omitting one or more CSI reports corresponding to one or more of the plurality of CSI report configurations.

In a seventh example, the one or more processors of the sixth example, wherein omitting the one or more CSI reports is based on a predetermined priority rule.

In an eighth example, the one or more processors of the sixth example, wherein the UE capability is based on a maximum number of CSI processing units (CPUs) to process one or more CSI reports and a maximum number of resources that the UE can process simultaneously.

In a ninth example, the one or more processors of the eighth example, wherein the number of CPUs required to process a multi-TRP report is doubled when determining how many CPUs are required to process a given CSI report.

In a tenth example, the one or more processors of the first example, wherein the operations further comprise determining a CSI based on the at least one reference resource configuration and transmitting the CSI to the base station.

In an eleventh example, the one or more processors of the tenth example, wherein transmitting the CSI includes transmitting a first CSI report corresponding to a first TRP and a second CSI report corresponding to a second TRP.

In a twelfth example, the one or more processors of the tenth example, wherein transmitting the CSI includes transmitting a first CSI resource set corresponding to a first TRP and a second CSI resource set corresponding to a second TRP.

In an thirteenth example, the one or more processors of the tenth example, wherein transmitting the CSI includes transmitting a first CSI resource corresponding to a first TRP and a second CSI resource corresponding to a second TRP.

In a fourteenth example, the one or more processors of the first example, wherein the operations further comprise transmitting a CSI report to the base station, wherein the CSI report includes at least one rank indicator (RI) corresponding to at least one TRP.

In a fifteenth example, the one or more processors of the fourteenth example, wherein an RI equal to zero indicates that the UE does not prefer the corresponding TRP.

In a sixteenth example, the one or more processors of the fourteenth example, wherein the at least one RI includes a first RI corresponding to a first TRP and a second RI corresponding to a second TRP, and wherein the operations further comprise jointly encoding the first RI and the second RI to obtain a joint RI, wherein the joint RI is included in the CSI report.

In a seventeenth example, the one or more processors of the sixteenth example, wherein a maximum difference between the first RI and the second RI is 1.

In an eighteenth example, the one or more processors of the sixteenth example, wherein for a single downlink control information (DCI) based multi-TRP spatial domain multiplexing (SDM) mode, a maximum value for each RI is 2.

In a nineteenth example, the one or more processors of the eighteenth example, wherein for all single-DCI based multi-TRP modes, except the single-DCI based multi-TRP SDM mode, the first RI is equal to the second RI.

In a twentieth example, the one or more processors of the first example, wherein the operations further comprise transmitting a CSI report to the base station, wherein the CSI report includes at least one precoding matrix indicator (PMI) corresponding to at least one TRP.

In a twenty-first example, the one or more processors of the first example, wherein the operations further comprise transmitting a CSI report to the base station, wherein the CSI report includes at least one channel quality indicator (CQI) corresponding to at least one TRP.

In a twenty-second example, the one or more processors of the twenty-first example, wherein the at least one CQI includes a first CQI corresponding to a first TRP and a second CQI corresponding to a second TRP, and wherein for multi-DCI based multi-TRP reporting, the operations further comprise jointly encoding the first CQI and the second CQI using differential encoding.

In a twenty-third example, the one or more processors of the twenty-first example, wherein for single-DCI based multi-TRP reporting, the at least one CQI is a single CQI.

In a twenty-fourth example, the one or more processors of the first example, wherein the operations further comprise transmitting a single-DCI based multi-TRP scheme preference to the base station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:

a transceiver configured to connect to a base station; and a processor communicatively coupled to the transceiver and configured to perform operations comprising:

receiving, from the base station, at least one channel state information (CSI) report configuration, wherein each CSI report configuration includes at least one reference resource set configuration, wherein each reference resource set configuration includes multiple CSI-reference signal (RS) resources, wherein a first portion of the multiple CSI-RS resources are configured for a single transmission and reception point (TRP) mode and a second portion of the multiple CSI-RS resources are for configured for a multiple TRP (multi-TRP) mode; and sending, to the base station, a CSI report comprising at least a CSI reference signal indication (CRI) indicating whether the UE prefers the single TRP mode or the multi-TRP mode.

2. One or more processors configured to perform operations comprising:

receiving, from a base station, at least one channel state information (CSI) report configuration, wherein each CSI report configuration includes at least one reference resource set configuration, wherein each reference resource set configuration includes multiple CSI-reference signal (RS) resources, wherein a first portion of the multiple CSI-RS resources are configured for a single transmission and reception point (TRP) mode and a second portion of the multiple CSI-RS resources are for configured for a multiple TRP (multi-TRP) mode; and sending, to the base station, a CSI report comprising a CSI reference signal indication (CRI) indicating whether a user equipment (UE) prefers the single TRP mode or the multi-TRP mode.

3. The one or more processors of claim 2, wherein one or more of (a) the at least one CSI report configuration, (b) at least one reference resource set configuration, and (c) at least one reference resource set configuration correspond to one of the single TRP mode or the multi-TRP mode.

4. The one or more processors of claim 3, wherein the operations further comprise:

performing CSI measurements based on the at least one reference resource set configuration, wherein the CSI measurements correspond to the at least one CSI report configuration that corresponds to a preferred TRP mode.

5. The one or more processors of claim 3, wherein the at least one reference resource set configuration includes one or more reference resource sets corresponding to the single TRP mode and one or more reference resource sets corresponding to the multi-TRP mode.

6. The one or more processors of claim 2, wherein when the at least one CSI report configuration includes a plurality of CSI report configurations that exceed a UE capability, the operations further comprise:

omitting one or more CSI reports corresponding to one or more of the plurality of CSI report configurations.

7. The one or more processors of claim 6, wherein omitting the one or more CSI reports is based on a predetermined priority rule.

8. The one or more processors of claim 6, wherein the UE capability is based on a maximum number of CSI processing units (CPUs) to process one or more CSI reports and a maximum number of resources that the UE can process simultaneously.

9. The one or more processors of claim 2, wherein the operations further comprise:

determining a CSI based on the at least one reference resource set configuration; and transmitting the CSI to the base station, wherein transmitting the CSI comprises one of, (a) transmitting a first CSI report corresponding to a first TRP and a second CSI report corresponding to a second TRP, (b) transmitting a first CSI resource set corresponding to a first TRP and a second CSI resource set corresponding to a second TRP, or (c) transmitting a first CSI resource corresponding to a first TRP and a second CSI resource corresponding to a second TRP.

10. The one or more processors of claim 2, wherein the operations further comprise:

transmitting a CSI report to the base station, wherein the CSI report includes at least one rank indicator (RI) corresponding to at least one TRP.

11. The one or more processors of claim 10, wherein an RI equal to zero indicates that the UE does not prefer the corresponding TRP.

12. The one or more processors of claim 10, wherein the at least one RI includes a first RI corresponding to a first TRP and a second RI corresponding to a second TRP, and wherein the operations further comprise:

jointly encoding the first RI and the second RI to obtain a joint RI, wherein the joint RI is included in the CSI report.

13. The one or more processors of claim 12, wherein a maximum difference between the first RI and the second RI is 1.

14. The one or more processors of claim 12, wherein for a single downlink control information (DCI) based multi-TRP spatial domain multiplexing (SDM) mode, a maximum value for each RI is 2.

15. The one or more processors of claim 14, wherein for all single-DCI based multi-TRP modes, except the single-DCI based multi-TRP SDM mode, the first RI is equal to the second RI.

16. The one or more processors of claim 2, wherein the operations further comprise:

transmitting a CSI report to the base station, wherein the CSI report includes at least one precoding matrix indicator (PMI) corresponding to at least one TRP.

17. The one or more processors of claim 2, wherein the operations further comprise:

transmitting a CSI report to the base station, wherein the CSI report includes at least one channel quality indicator (CQI) corresponding to at least one TRP.

18. The one or more processors of claim 17, wherein the at least one CQI includes a first CQI corresponding to a first TRP and a second CQI corresponding to a second TRP, and wherein for multi-DCI based multi-TRP reporting, the operations further comprise:

jointly encoding the first CQI and the second CQI using differential encoding.

19. The one or more processors of claim 2, wherein the operations further comprise:

transmitting a single-DCI based multi-TRP scheme preference to the base station.

20. The one or more processors of claim 2, wherein each resource set configuration is a nzp-CSI-RS-ResourceSet information element (IE).

* * * * *